United States Patent
Prieur et al.

[15] 3,688,643
[45] Sept. 5, 1972

[54] APPARATUS FOR FORMING PILGER DIE GROOVES

[72] Inventors: Hubertus Prieur, Canfield, Ohio; Walter Vom Dorp, Rheydt; Fritz Zeunert, Rheydt-Rheineland, both of Germany

[73] Assignee: The McKay Machine Company, Younstown, Ohio

[22] Filed: Dec. 18, 1969

[21] Appl. No.: 886,095

[30] Foreign Application Priority Data

Jan. 9, 1969 Germany..........P 18 13 281.5

[52] U.S. Cl. ..................90/24.3, 90/26, 90/13.9, 90/11 R, 82/18
[51] Int. Cl. ...............................................B23d 5/00
[58] Field of Search.....90/11 R, 11 C, 15, 13.9, DIG. 11, 90/24.3, 26; 82/18, 19, 2 D

[56] References Cited

UNITED STATES PATENTS

| 2,109,454 | 3/1938 | Becker | 82/18 |
| 1,918,139 | 7/1933 | Schimmel | 82/19 X |
| 3,129,639 | 4/1964 | Wadleck | 90/11 |
| 1,705,893 | 3/1929 | Barnhart | 90/13.9 |
| 1,919,290 | 7/1933 | Christman | 90/13.9 |

FOREIGN PATENTS OR APPLICATIONS

| 744,316 | 2/1956 | Great Britain | 82/2.4 |

Primary Examiner—Gil Weidenfeld
Attorney—Williams and Kreske

[57] ABSTRACT

Apparatus and method of forming pilger die grooves in die blanks in which the grooves are not only tapered longitudinally in the conventional manner but in which the grooves have a continuously variable side relief extending in a smooth circular arc from the die groove root to opposed die groove sides.

6 Claims, 5 Drawing Figures

PATENTED SEP 5 1972
3,688,643
SHEET 1 OF 2
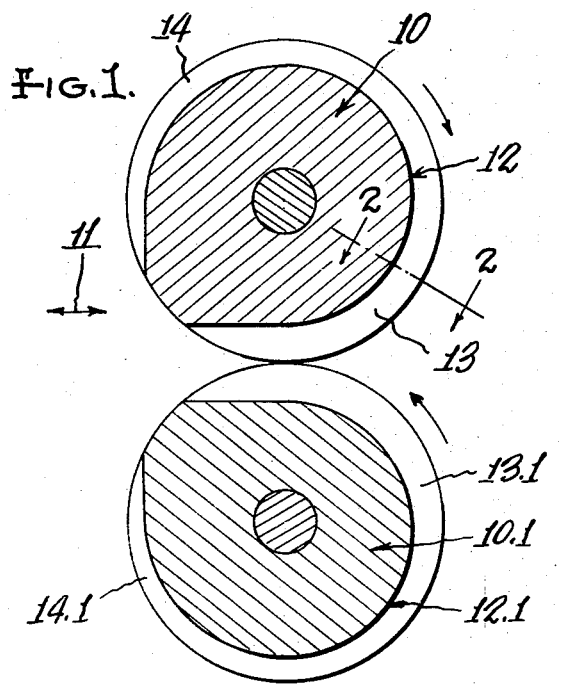
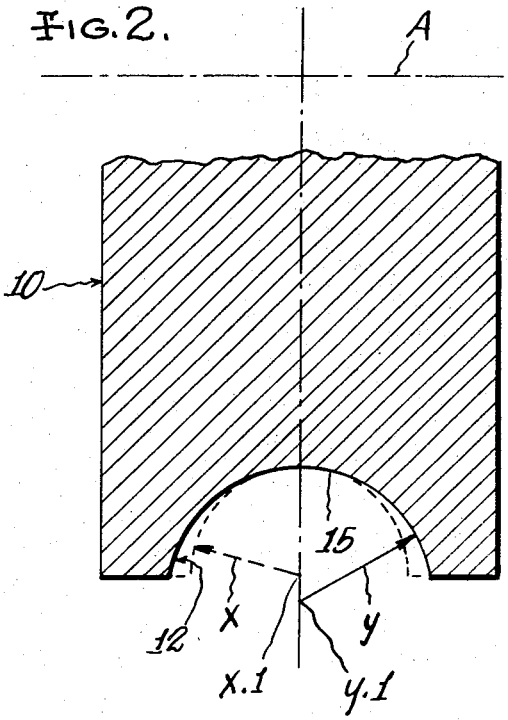
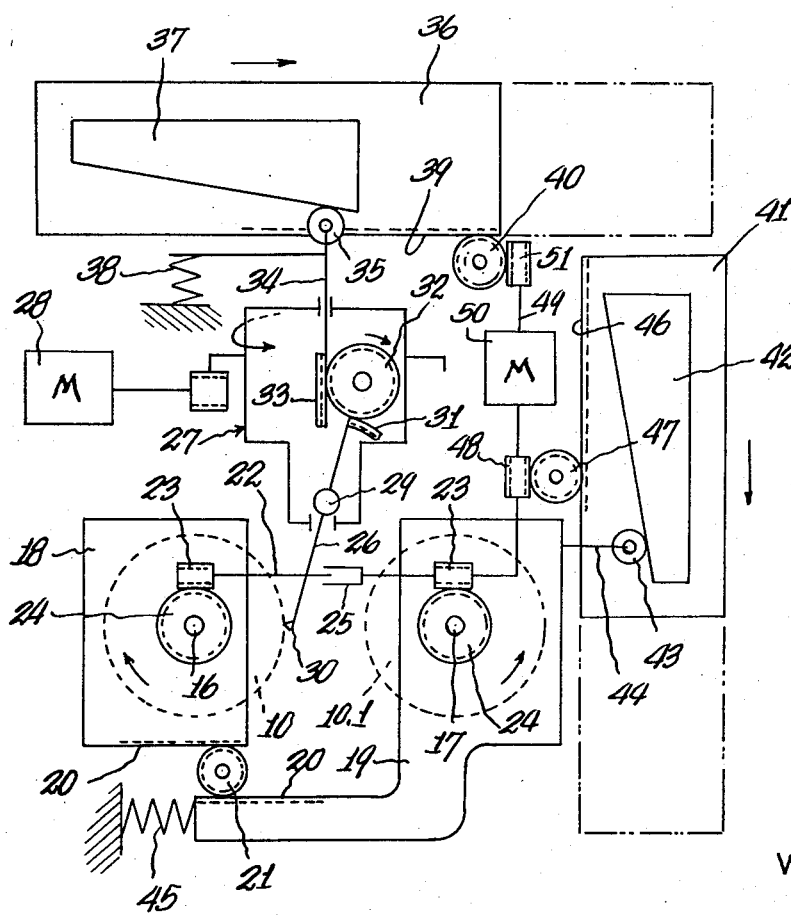
INVENTORS
HUBERTUS PRIEUR
WALTER VOM DORP
FRITZ ZEUNERT
BY Williams and Kreske
ATTORNEYS

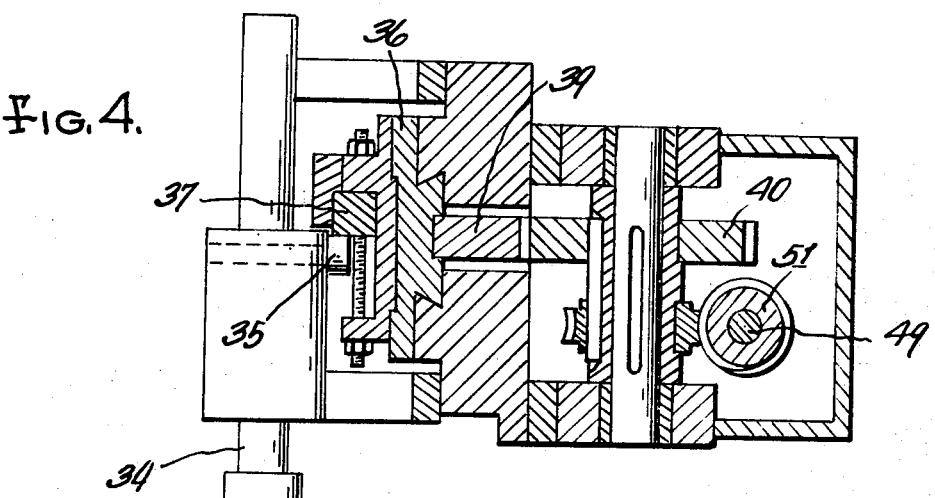
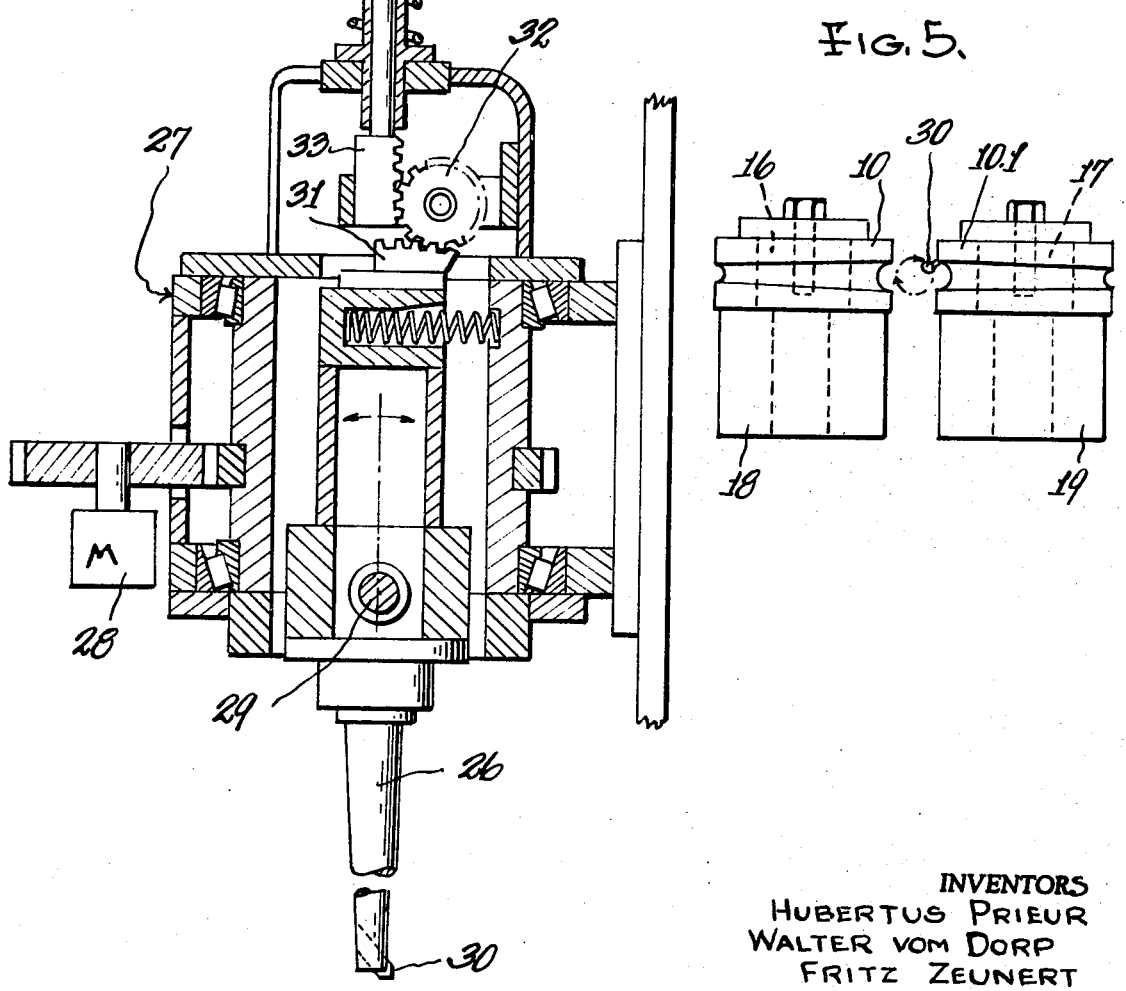

3,688,643

APPARATUS FOR FORMING PILGER DIE GROOVES

BACKGROUND AND SUMMARY

The desirability of forming pilger die grooves with a side relief has long been known; however, the formation of such side relieved grooves has been difficult due to the fact that a pilger die groove is longitudinally tapered along at least a portion of the periphery of the die blank in which it is formed. When conventional methods and apparatus are used to form pilger die grooves with a side relief, considerable hand labor of a most skilled type is necessitated thus markedly increasing die costs. Moreover, despite the exercise of the greatest care, the die grooves thus formed seldom, if ever, had the precise profile desired.

The method of the present invention is characterized by not only rotating the die groove cutting tool about a variable effective radius which is so coordinated with rotation of the die blank that the required tapered groove will be cut into the die blank periphery in the usual manner, but by increasing the effective radius of rotation of the cutting tool by an amount which will provide the requisite side relief and at the same time increasing the spacing between the axis of rotation of the die blank and the axis of rotation of the cutting tool by an amount equal to the effective increase in radius aforesaid of the cutting tool.

The apparatus of the present invention is characterized from conventional, pilger die groove forming apparatus in that means is provided for varying the spacing between the rotational axis of the die groove cutting tool and that of the die blank in coordination with rotation of the latter to thus form a pilger die groove having the continuously variable side relief contemplated.

By use of the present invention, pilger die grooves with the precise side relief desired may be made with great accuracy and at relatively low cost as compared to the prior art. No hand labor is required to bring the die groove to its final form nor is it necessary to shift from one machine to another to complete the machining operation. These and other advantages will readily become apparent from a study of the following specification and from the attached drawing.

DRAWING DESCRIPTION

In the drawing accompanying this specification and forming a part of this application there is shown, for purpose of illustration, an embodiment which the invention may assume, and in this drawing:

FIG. 1 is a sectional view of a pair of pilger dies in normal use position,

FIG. 2 is an enlarged sectional view generally corresponding to the line 2—2 of FIG. 1, FIG. 3 is a diagrammatic view of apparatus embodying the present invention, and FIGS. 4 and 5 are fragmentary structure drawings of the apparatus schematically shown in FIG. 3.

DETAILED DESCRIPTION

With reference first to FIG. 1, there is illustrated a pair of pilger dies 10, 10.1 rotatably mounted in the usual carriage (not shown) reciprocable in the direction of the arrow 11. In the usual manner, the dies 10, 10.1 are interconnected for unitary rotation. Dies 10, 10.1 are peripherally grooved to receive elongated stock to be transversely reduced and, as is usual in such dies, respective die grooves 12, 12.1 are tapered longitudinally. That is, the grooves are larger at respective ends 13, 13.1 than they are at their ends 14, 14.1.

Turning now to the enlarged, fragmentary sectional view FIG. 2, the transverse profile of the side relieved die groove 12 is shown, somewhat exaggerated, in full lines while for comparison, an identically sized but unrelieved die groove is shown by phantom line. It is important to note that the root portion 15 or depth of the relieved die groove is at all places identical to that of the conventional unrelieved die groove; however, the relieved die groove is defined by a circular arc which is larger in radius than the unrelieved die groove to thereby provide side relief.

In final machining the conventional, unrelieved die groove shown in phantom lines, a suitable cutting tool (not shown) will be rotated about a radius X whose axis of rotation X.1 is fixed with respect to the axis of rotation A of the die blank even though the radius X varies from end to end of the groove to provide the necessary taper thereto.

On the other hand, in final machining the relieved die groove shown in full lines, the cutting tool will be rotated about a larger radius Y whose rotational axis Y.1 is spaced a greater distance from the axis A of die blank rotation then is axis X.1 by an amount equal to the increase in radius of Y over X. Variation of the radius Y to produce the necessary end to end groove taper, of course, also necessitates a corresponding variation in the spacing between the axis of rotation A of the die blank and the cutting tool rotational axis Y.1 to maintain the relationship hereinabove disclosed.

With reference now to FIG. 3 wherein apparatus for forming improved pilger die grooves is diagrammatically shown, a pair of spindles 16, 17 are rotatably carried by respective heads 18, 19 which are mounted for movement toward and away from each other. Heads 18, 19 are provided with rack teeth 20 engaged with rotatably mounted, fixedly positioned gear 21, the interconnection providing for identical but opposite movement of the heads 18, 19. Spindles 16, 17 are connected together for unitary but opposite rotation by a shaft 22 mounting worms 23 engaged with worm gears 24 carried by respective spindles. A suitable telescopic connection 25 is provided in shaft 22 to permit the aforesaid movement of the heads 18, 19 and their supported spindles. Suitably mounted on spindles 16, 17 are uncut dies, or die blanks 10, 10.1. Mounted for rotation between the die blanks 10, 10.1 and about an axis normal to the spindles 16, 17 is a cutting tool holder 26 carried by a rotatably mounted head 27. Head 27 is adapted to be rotated as indicated by the arrow by means of a motor 28 suitably geared or otherwise drivingly connected to the head 27. It is important to note that the cutting tool holder 26 is pivoted to the head 27 at 29 whereby the effective radius of rotation of a cutter 30 mounted on its free end may be varied in the following manner.

The inner end of the tool holder 26 mounts a gear segment 31 engaged with a gear 32 carried by the head. Also engaged with gear 32 is a slidably mounted rack 33 terminating in a cam follower roller 35. The arrangement is such that so long as rack 33 is held against axial movement, tool 30 will be rotated by the head 27 about a fixed effective radius. When, however, rack 33 is moved axially, gear 32 will be rotated and through gear segment 31, the amount of tilt of tool holder 26 will be varied to thus vary the effective radius of rotation of the cutter 30.

Mounted adjacent the cam follower 35, is a slide 36 mounting a cam 37 with which the follower is engaged and a spring 38 maintains follower 35 in engagement with the cam. Slide 36 is reciprocable between its full and phantom line positions and carries rack teeth 39 engaged with a gear 40.

Mounted adjacent the previously mentioned head 19 mounting the spindle 17 is a slide 41 which is reciprocable between its full and phantom line positions. Secured to slide 41 is a cam 42 and a cam follower roller 43 is mounted on the head 19, as by means of an arm 44, for engagement with the cam. A spring 45 biases head 19 in a direction to maintain cam follower 43 in engagement with cam 42. In a manner similar to slide 36, slide 41 carries rack teeth 46 engaged with a gear 47.

Means are provided for rotating the gear 47 and as herein shown, a drive gear 48 is mounted on one end of a double-end, output shaft 49 of a motor drive unit 50. To the opposite end of output shaft 49 is secured a drive gear 51 engaged with the previously mentioned gear 40. Output shaft 49 is extended beyond drive gear 48 and has suitable driving connection with the previously disclosed shaft 22 on which are mounted the worms 23.

With the parts positioned as seen in full lines in FIG. 3, energization of motor 28 will effect rotation of head 27, the tool holder 26 and, of course, the attached cutting tool 30. Note that tool holder 26 is at this time tilted so that cutting tool 30 will rotate about a maximum effective radius equivalent to the large end of the die groove. Assuming that the cutting tool 30 is taking a slight cut from the die blanks 10, 10.1, motor 50 will now be energized to slowly rotate the die blanks in the directions indicated and to effect a slow travel of the slides 36, 41 toward their phantom line positions. Movement aforesaid of slide 36 will cause the follower 35 to move down the incline of cam 37 to gradually reduce the degree of tilt of tool holder 26 and to thus gradually reduce the effective radius of rotation of the cutter 30. At the same time, movement aforesaid of the slide 41 will cause the follower 43 to move up the incline of cam 42 to thereby simultaneously move the slides 18, 19 and the die blanks respectively supported thereon, toward each other.

During an initial machining operation, tool 30 will cease to cut the die blanks after but a small amount of rotation of the die blanks. When this occurs, all parts will then be returned to the full line positions shown and an adjustment will be made to cause tool 30 to cut slightly deeper into the die blanks. While such adjustment could take various forms, a convenient expedient is to slightly increase the length of arm 44 mounting the follower 43. This will move the die blanks together by an amount equal to the depth of cut desired during the next cutting operation. With the tool 30 now cutting the dies 10, 10.1 once again at what will be the large end of the die grooves, motor 50 will again be energized to rotate the die blanks as before and effect traverse of the slides 36, 41 as previously described.

The foregoing operations will be repeated until a complete die groove of the required depth has been cut into the peripheries of respective die blanks, such die grooves having the required longitudinal taper effected by the cam 37 and the required side relief effected by the cam 42.

We claim:

1. Apparatus for forming a pilger die groove in the periphery of a die blank and having means supporting said die blank for rotation about a first axis, means supporting a cutting tool for engagement with said die blank and for rotation about a second axis spaced from and normal to said first axis, pivot means normal to said second axis for supporting the cutting tool at an effective radius of rotation with respect to said second axis, and means for varying the effective radius of rotation of said cutting tool in coordination with rotation of said die blank to form a tapered peripheral groove in said die blank which is of greater radius at one place on the die blank periphery than it is at another place on the die blank periphery, means for varying the spacing between the rotational axis of said cutting tool and that of said die blank in coordination with rotation of the latter to provide for formation in said die blank periphery of a die groove having a continuously variable side relief extending in a smooth circular arc from the die groove root to opposed die groove sides.

2. The construction of claim 1 wherein means effects rotation of said die blank, and wherein said means for varying the spacing between the rotational axis of said cutting tool and that of said die blank is interconnected with said means for effecting die blank rotation to effect the coordinated movement aforesaid.

3. The construction of claim 1 wherein said means for varying the spacing between the rotation axis of said cutting tool and that of said die blank comprises cam means, and wherein said cam means is so connected to said die blank that rotation of the latter and movement of said cam means is coordinated for purpose aforesaid.

4. The construction of claim 3 wherein said means for varying the effective radius of rotation of said cutting tool also comprises cam means, and wherein each of said cam means is so connected to said die blank that the rotation of the latter and movement of said cam means is coordinated for purpose aforesaid.

5. The construction of claim 1 wherein a pair of movably supported heads rotatably support respective die blanks for engagement by said cutting tool, wherein means interconnect said heads for simultaneous movement to vary the spacing of respective die blank rotational axes from the rotational axis of said cutting tool, wherein means effects simultaneous rotation of said die blanks, and wherein said means for varying the spacing between the rotational axis of said cutting tool and that of respective die blanks is interconnected with said means for effecting die blank rotation to effect the coordinated movement aforesaid.

6. The construction of claim 5 wherein said means for varying the effective radius of rotation of said cutting tool comprises a movably mounted first cam,
  wherein said means for varying the spacing between the rotational axis of said cutting tool and that of respective die blanks comprises a movably mounted second cam,
  and wherein each of said cams is so connected to respective die blanks that rotation of the latter and movement of said cams is coordinated for purpose aforesaid.

* * * * *